United States Patent Office 3,394,996
Patented July 30, 1968

3,394,996
FLUORIDE ADSORPTION BY THORIUM OXIDE IN AQUEOUS THORIUM NITRATE SOLUTIONS
Robert C. Kispert and Takeo R. Kato, Cincinnati, Ohio, assignors to the United States of America as represented by the United States Atomic Energy Commission
No Drawing. Filed Sept. 15, 1967, Ser. No. 668,239
4 Claims. (Cl. 23—345)

ABSTRACT OF THE DISCLOSURE

The present invention relates to a method for removing fluoride from an aqueous solution of thorium nitrate. Thorium nitrate solution containing fluoride ion is contacted with finely divided thoria which has been calcined to a temperature not in excess of 900° F. to produce a thoria having a $ThO_2/F$ mole sorptive ratio of at least 14:1, which ratio is essential for effective sorption of contaminating fluoride ion.

---

The invention described herein was made in the course of, or under, a contract with the United States Atomic Energy Commission.

Background of the invention

The present invention relates to a method of removing fluoride ions from aqueous solutions of thorium nitrate.

The major source of uranium-233 is derived from the neutron exposure of densified compacts of thoria. In order to retrieve the uranium-233 and any unconverted thorium, the neutron-irradiated thoria compacts are dissolved in a fluoride catalyzed nitric acid dissolution medium and the resultant thorium-uranium solution serves as the feed liquor for a solvent extraction process designed to separate and purify thorium and uranium. Fluoride ions in amounts up to 2000 p.p.m. of thorium are routinely used to enhance the dissolution rate of these compacts. However, the presence of fluoride in purified thorium or thoria is regarded as a possible contaminant because it prevents attainment of maximum compact density and increases the chemical reaction of the otherwise inert thoria. Fluoride is also found as a contaminant in leach liquors formulated by dissolving thorium-bearing ores with nitric acid.

It should be noted that at this point that many standard solvent extraction systems designed to purify and separate thorium will achieve a small amount of fluoride decontamination, usually in the scrubbing stages. However, the magnitude of the decontamination factor is too small to deal effectively with the fluoride contamination level normally found in fluoride catalyzed dissolution media for thorium. A fluoride catalyzed acid solution of this type usually will contain from 1000 to as much as 5000 p.p.m. fluoride on a thorium basis. It is accordingly the main object of this invention to provide a method of decontaminating fluoride from aqueous solutions of thorium nitrate in an efficient and economic manner.

Description of the invention

The inventive concept which will satisfy the above and related objects is based on the discovery that finely divided thoria of a particular quality and concentration will selectively and quantitatively sorb fluoride from aqueous thorium nitrate solution. An acceptable grade of thoria suitable for fluoride sorption is obtained by the low temperature calcination, in the range 500° F.–900° F. of thorium hydroxide ($ThO_4$), and subsequent milling of the resultant thoria, $ThO_2$, to a particle size in the range 10 to 80 microns. Alternate but less desirable sources of thoria are obtained from the denitration of thorium nitrate or from sol gel processes. Higher calcination temperatures lead to thorium oxide sintering, thereby reducing the fluoride sorptive capacity. The amount of added thoria needed to function as an efficient fluoride decontaminant will depend on the amount of fluoride in solution. We have found that a thoria-to-fluoride mole ratio of at least 14:1 must be used in order to realize the sorptive quality of the thoria. When the mole ratio is less than 14:1 the thoria becomes solubilized to an appreciable extent. Since thorium is not a harmful contaminant, the solubilization of $ThO_2$ will not produce any harmful or costly results. Increasing the thoria usage above the minimum mole ratio of 14:1 will result in a somewhat greater increase in efficiency as measured by the decontamination factor and total amount of fluoride sorbed. The reactive thoria surface available for fluoride sorption when a 14:1 mole ratio is used will usually have sufficient capacity for attaining virtually complete fluoride removal from a feed containing up to 3000 p.p.m. fluoride. Feeds treated with thoria in these amounts will, in most instances, have final fluoride concentrations of considerably less than 100 p.p.m. on a thorium basis.

In order to practice this invention to effect fluoride sorption it is only necessary to contact a fluoride-containing thorium nitrate solution with the required quality and quantity of milled thoria at a temperature in the range 75° F. to 100° F. It is preferred to operate the decontamination at room temperature because higher temperatures result in adverse thoria solubilization. Once the thoria is added, the resulting dispersion is agitated and a period of time is allowed for a settling of the thoria. The contacted solution is then treated such as by filtration or decantation in order to separate the liquid phase from the insoluble fluoride-sorbed thoria mass. Using a thoria obtained from the air calcination of thorium hydroxide at a temperature in the range 600° F.–900° F. a series of decontamination tests was performed, the results of which are summarized in Table I.

TABLE I.—FLUORIDE ADSORPTION AT 75° F. USING MILLED THORIUM OXIDE

| Test | Th(OH)$_4$ Calc.[1] Temperature (° F.) | Initial Aqueous Conc. | | | Adsorbent/F-, Mole Ratio | Final Aqueous Conc. | | | F- Adsorption | |
|---|---|---|---|---|---|---|---|---|---|---|
| | | Th (g./l.) | HNO$_3$ (M) | F$^{-2}$ (p.p.m.[2]) | | Th (g./l.) | HNO$_3$ (M) | F- (p.p.m.[2]) | (percent) | Decont. Factor |
| F | 600 | 360 | 4.8 | 2,050 | 9/1 | 419 | 3.71 | 2,150 | ([3]) | ([3]) |
| | | | | | 28/1 | 376 | 4.48 | 80 | 96 | 26 |
| G | 900 | 360 | 4.8 | 2,050 | 9/1 | 369 | 4.56 | 240 | 89 | 8.6 |
| | | | | | 28/1 | 375 | 4.34 | 430 | 78 | 4.8 |
| H | 600 | 360 | 4.4 | 1,800 | 9/1 | 431 | 3.25 | 1,750 | ([3]) | ([3]) |
| | | | | | 19/1 | 367 | 4.22 | 57 | 97 | 32 |
| | | | | | 28/1 | 377 | 2.58 | <3 | 100 | >600 |
| | | | | | 38/1 | 382 | 3.94 | 21 | 99 | 86 |
| I | 600 | 360 | 4.4 | 1,800 | 31/1 | 385 | | 145 | 91 | 12 |
| J | 600 | 357 | 4.4 | 1,800 | 14/1 | 373 | | 19 | 99 | 93 |
| | | | | | 16/1 | 377 | | <3 | 100 | >590 |
| K | 600 | 357 | 4.4 | 1,750 | 32/1 | 380 | | 21 | 99 | 84 |
| M | 600 | 354 | 4.4 | 1,750 | 32/1 | 346 | | 43 | 98 | 41 |
| N | 600 | 206 | 3.2 | 2,950 | 9/1 | 227 | 2.90 | 93 | 97 | 32 |
| | | | | | 12/1 | 217 | 3.04 | 23 | 99 | 129 |
| | | | | | 18/1 | 217 | 3.03 | 9 | 100 | 329 |

[1] Thorium oxide was obtained from the calcination of impure thorium hydroxide.
[2] Parts per million—Th basis.
[3] Excessive thorium oxide solubilization occurred.

It can be seen that excellent fluoride sorption was realized from contacting aqueous feed with thoria calcined at 600° F. using a minimum thoria-to-fluoride mole ratio of about 14:1. Thorium oxide calcined at 900° F. was not as effective in reducing the fluoride concentration in comparison to material calcined at 600° F. When a $ThO_2/F$ mole ratio of less than about 10:1 was employed, the sorptive quality of thoria was lost due to its excess solubility in the feed solution. The use of very low thoria-to-fluoride ratios of the order of 1:1 in scoping tests produced high viscosity gel which was broken up by the addition of further amounts of thoria. When additional thoria was added and the gel was broken, the resultant slurry became easy to filter. Thus, the minimal thoria-to-fluoride mole ratio of 14:1 served to prevent gel formation as well as to avoid thoria solubilization. An increase in the thoria-to-fluoride concentration in excess of the minimum mole ratio of 14:1 results in somewhat increased efficiency of fluoride removal up to some maximum depending on the nature of the initial feed solution.

The fluoride decontaminated thorium nitrate solution may now be used as the feed liquor in a solvent extraction system designed to isolate and purify thorium from other cationic impurities. A solvent extraction system based on the use of diamyl amyl phosphonate is typical of several well known organic solvents useful in the purification of thorium from aqueous nitrate solutions. Tests have shown that a fluoride decontamination of about 5 can be obtained in the first stage of a diamyl amyl phosphonate extraction system. The data summarized in Table I clearly indicates that a decontamination factor of at least 30 can be obtained by using calcined thorium hydroxide in a fluoride sorption feed treatment step. Hence, it is clear that a product specification requirement of less than 100 p.p.m. product fluoride concentration can be more than adequately satisfied by the use of calcined thorium hydroxide in a fluoride sorption feed treatment step coupled with a diamyl amyl phosphonate extraction operation.

In any practical flow sheet for removing fluoride from thorium nitrate solutions, it would be desirable to provide means for desorbing the fluoride from the activated thorium. We have found that satisfactory fluoride desorption can be achieved when the fluoride-loaded thoria is reacted with steam at a temperature in the range 600° F.–1100° F. The reaction of fluoride with steam produces hydrofluoric acid which can be cycled back as the source of fluoride for digesting thorium (as found in thorium-bearing ores) or thoria compacts. Thoria which has been desorbed at temperatures in the range 600° F.–900° F. can be used for further fluoride sorption of the digested feed while desorbed thoria which has been steam treated at temperatures above 900° F. can be used to adjust thorium concentration in the solvent extraction feed. Thus, the use of calcined thoria as a fluoride sorptive agent combined with steam decontamination of the resulting fluoride saturated thoria allows the practice of a chemical flow sheet in which the thoria and fluoride can be continuously used in a closed cycle flow arrangement to produce thorium nitrate product solutions effectively decontaminated from fluoride. The net result is a versatile and economic fluoride decontamination flow sheet for fluoride-loaded thorium nitrate solutions.

What is claimed is:

1. A method for removing fluoride from aqueous solutions of thorium nitrate which comprises contacting said solution with finely divided thoria which has been calcined to a temperature not in excess of 900° F. to produce sorption of fluoride ion at a $ThO_2/F$ mole ratio of 14:1.

2. The method according to claim 1 in which the solution is at a temperature in the range 75° F.–100° F.

3. The method according to claim 1 wherein the $ThO_2$ is derived from the calcination of $Th(OH)_4$.

4. The method according to claim 1 wherein the fluoride-sorbed $ThO_2$ is separated from the contacted solution and treated with steam at a temperature in the range 600° F.–1100° F. to remove fluoride as HF.

References Cited
UNITED STATES PATENTS 3,153,569  10/1964  Duncan _____ 23—345

CARL D. QUARFORTH, *Primary Examiner.*

M. J. McGREAL, *Assistant Examiner.*

PO-1050
(5/69)

UNITED STATES PATENT OFFICE
CERTIFICATE OF CORRECTION

Patent No. 3,394,996               Dated July 30, 1968

Inventor(s) Robert C. Kispert and Takeo R. Kato

It is certified that error appears in the above-identified patent and that said Letters Patent are hereby corrected as shown below:

In claim 1, column 4, line 28, before "14:1", insert -- at least --.

SIGNED AND
SEALED
APR 7 1970

(SEAL)
Attest:

Edward M. Fletcher, Jr.
Attesting Officer

WILLIAM E. SCHUYLER, JR.
Commissioner of Patents